(12) United States Patent
Gupta et al.

(10) Patent No.: US 10,379,743 B1
(45) Date of Patent: Aug. 13, 2019

(54) OFFLOADED DELETE OPERATIONS

(71) Applicant: EMC Corporation, Hopkinton, MA (US)

(72) Inventors: Anjali Gupta, Bangalore (IN); Chandrashekhar Singh, Arrah (IN); Mejo Devassy Kannanayakkal, Kuriachira (IN); Subhadip Das, Kolkata (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 148 days.

(21) Appl. No.: 15/192,847

(22) Filed: Jun. 24, 2016

(51) Int. Cl.
 *G06F 3/06* (2006.01)

(52) U.S. Cl.
 CPC ............ *G06F 3/0608* (2013.01); *G06F 3/065* (2013.01); *G06F 3/0652* (2013.01); *G06F 3/0689* (2013.01)

(58) Field of Classification Search
 CPC .............................. G06F 3/0652; G06F 3/0683
 See application file for complete search history.

(56) References Cited

U.S. PATENT DOCUMENTS 6,330,572 B1 * 12/2001 Sitka ................. G06F 17/30082
707/608

* cited by examiner

*Primary Examiner* — Gary W. Cygiel
(74) *Attorney, Agent, or Firm* — Dergosits & Noah LLP; Todd A. Noah

(57) ABSTRACT

Offloaded delete operations is described. A target system receives an offloaded data transfer token from a host, with the offloaded data transfer token specifying source data information. The target system identifies the source data and the source storage based on the source data information. The target system determines whether the offloaded data transfer token specifies an offloaded delete operation. The target system deletes the source data from the source storage if the offloaded data transfer token specifies the offloaded delete operation.

20 Claims, 4 Drawing Sheets

| Secure Flag | Delete Flag | Copy Flag | Resulting Operation |
|---|---|---|---|
| Not Set | Not Set | Not Set | None |
| Not Set | Not Set | Set | Copy |
| Not Set | Set | Not Set | Delete |
| Not Set | Set | Set | Move |
| Set | Not Set | Not Set | None |
| Set | Not Set | Set | Copy |
| Set | Set | Not Set | Secure Delete |
| Set | Set | Set | Secure Move |

FIG. 2

OFFLOADED DELETE OPERATIONS

BACKGROUND

A user of a client device can transfer client data (which may be in the form of a file or any data object) from a source storage device to a destination storage device that is compatible with the source storage device. First, the user can use the client device to request the client data from the source storage device. After the client device receives the requested client data from the source storage device, the user can instruct the client device to send this received client data to the destination storage device. Some storage systems provide such a user with an offloaded data transfer option that reduces the load on the client device's central processing unit(s). The user can use the client device to send an offloaded data transfer token to one or more such storage systems, with the offloaded data transfer token specifying the client data, the source storage device, and the destination storage device. Such a storage system(s) uses the offloaded data transfer token to identify the client data in the source storage device, identify the destination storage device, and transfer the client data from the source storage device to the destination storage device. After the client device sends the offloaded data transfer token to the storage system, the client device does not participate in receiving the client data or in sending the client data, thereby reducing the load on the client device's central processing unit(s) and eliminating the time spent by the client device receiving and sending the client data.

Data may be stored on a storage array, which is a disk storage system that includes multiple disk drives. Unlike a disk enclosure, a storage array has cache memory and advanced functionality, such as virtualization and Redundant Array of Independent Disks (RAID).

BRIEF DESCRIPTION OF THE DRAWINGS

FIG. 2 illustrates a table of example scenarios for offloaded operations, under an embodiment;

DETAILED DESCRIPTION

After a storage system(s) uses an offloaded data transfer token to transfer client data from a source storage device to a destination storage device, a user of a client device that requested the data transfer can delete the client data from the source storage device. First, such a user waits until after the storage system(s) sends a message to the client device that confirms the requested transfer of the client data from the source storage device to the destination storage device. Then the user uses the client device to send a delete request for the source storage device, requesting the deletion of the transferred client data stored by the source storage device. Receiving the confirmation message and sending the deletion request requires time and creates a load on the client device's central processing unit(s), especially when the client device requests a secure deletion of the transferred client data.

When a storage device receives a request to delete data, typically the storage device only deletes a reference to the data, while retaining the supposedly deleted data as unreferenced data. Therefore, a client device can execute a secure delete operation to delete confidential or sensitive data by overwriting the storage location of the confidential or sensitive data with randomly generated data, all "ones," all "zeros," and/or multiple combinations of overwriting with random data, ones, and/or zeros. A secure delete operation may require significant time to execute, and may create a significant load for a client device's central processing unit(s).

Embodiments herein offload delete operations. A target system receives an offloaded data transfer token from a host, the offloaded data transfer token specifying source data information. The target system identifies the source data and the source storage based on the source data information. The target system determines whether the offloaded data transfer token specifies an offloaded delete operation. The target system deletes the source data from the source storage if the offloaded data transfer token specifies the offloaded secure delete operation.

For example, a storage array component receives an offloaded data transfer token from a desktop computer component, with the offloaded data transfer token specifying a confidential data file and the storage array's first disk. The storage array component identifies the location of the confidential data file stored on the storage array's first disk. The storage array component executes a secure delete algorithm to securely delete the confidential data file from the storage array's first disk storage if the offloaded data transfer token includes a secure flag and a delete flag that specify an offloaded secure delete operation. No load is created for the desktop computer's central processing unit(s) to execute the secure delete algorithm, and no time is spent by the desktop computer receiving a transfer confirmation or sending a subsequent delete request.

Figure 1:
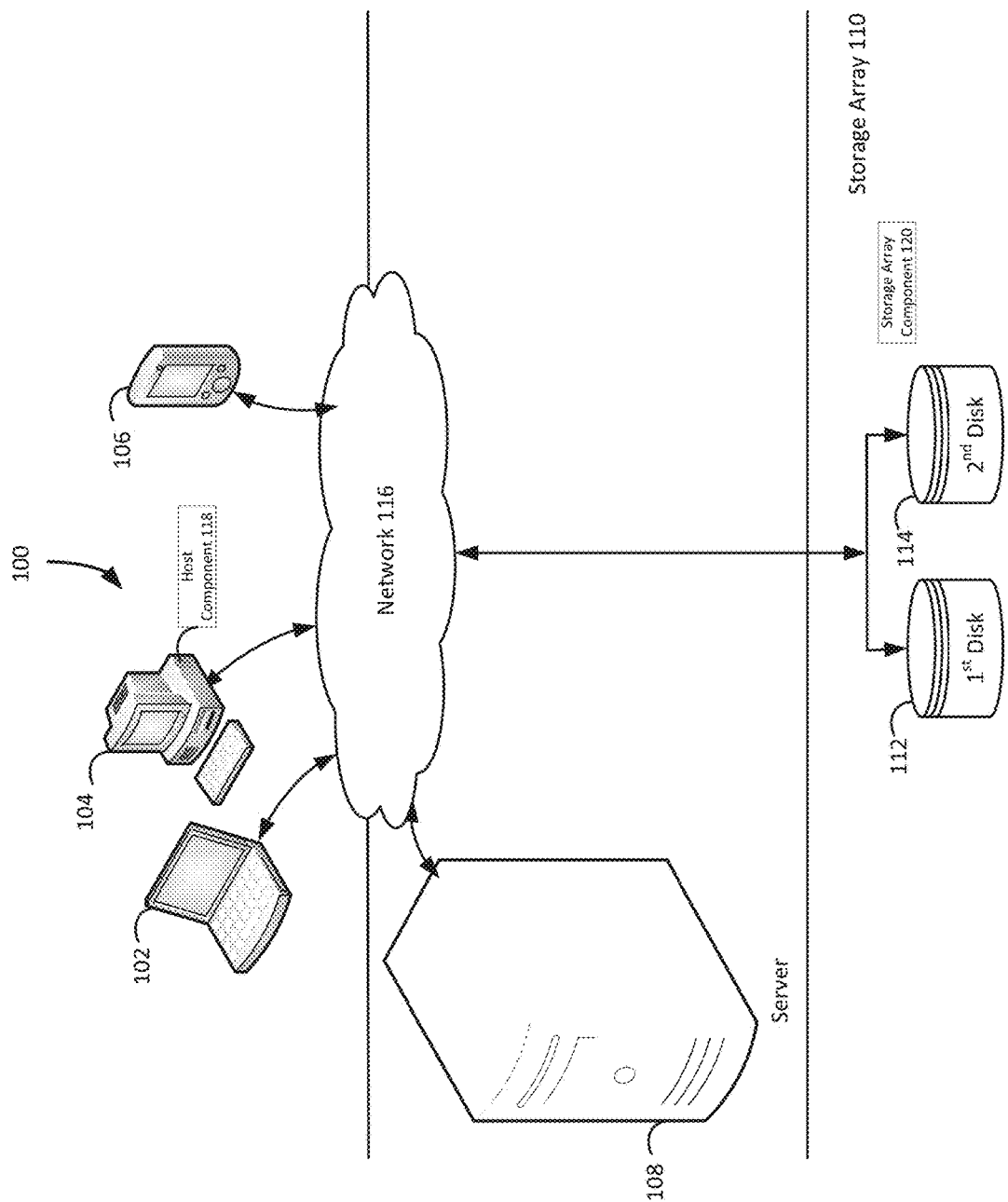
FIG. 1 illustrates a block diagram of an example system for offloaded delete operations, under an embodiment.

FIG. 1 illustrates a diagram of a system for offloaded delete operations, under an embodiment. As shown in FIG. 1, a system 100 may illustrate a cloud computing environment in which data, applications, services, and other resources are stored and delivered through shared datacenters and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a server 108 and a storage array 110 that may be provided by a hosting company. Although FIG. 1 depicts the first client 102 as the laptop computer 102, the second client 104 as the personal computer 104, and the third client 106 as the personal digital assistant 106, each of the clients 102-106 may be any type of computer, such as a server, and may be referred to as the hosts 102-106. The storage array 110 includes a first disk 112 and a second disk 114. While FIG. 1 depicts the storage array 110 as including the disks 112-114, the disks 112-114 may be any type of storage devices. Although FIG. 1 depicts the first disk 112 and the second disk 114 as parts of the same storage array 110, the first disk 112 may be part of the storage array 110 and the second disk 114 may be part of another storage array that is not depicted in FIG. 1. The clients 102-106, the server 108, and the storage array 110 communicate via a network 116. Although FIG. 1 depicts the system 100 with three clients 102-106, one server 108, one storage array 110, two disks 112-114, and one network 116, the system 100 may include any number of clients 102-106, any number of servers 108, any number of storage arrays 110, any number of disks 112-114, and any number of networks 116. The storage array 110 may be referred to as the target system 110, the offload provider 110, or the underlying storage array 110. Although FIG. 1 depicts the second client 104 as including a host component 118, each of the clients 102-106 may include their own host component 118. The host component 118 may be referred to as the client component 118, the initiator component 118, or the host system component 118. The storage array 110 includes a storage array component 120, which may be referred to as the target system component 120, the offload provider component 120, or the underlying storage array component 120. The clients 102-106 and the server 108 may each be substantially similar to the system 400 depicted in FIG. 4 and described below.

A target system receives an offloaded data transfer token from a host, with the offloaded data transfer token specifying source data information. For example, the storage array component 120 receives an offloaded data transfer token from the host component 118 of the desktop computer 104, with the offloaded data transfer token specifying a confidential data file and the storage array's first disk 112. All of the possible scenarios defined by the flags in the offloaded data transfer token are depicted in FIG. 2 and described below in reference to FIG. 2. Having received an offloaded data transfer token, a target system identifies source data and a source storage based on source data information. For example, the storage array component 120 identifies the location of the confidential data file stored on the storage array's first disk 112.

After receiving an offloaded data transfer token, a target system can determine what operations the offloaded data transfer token specifies. For example, the storage array component 120 first determines whether the offloaded data transfer token includes a copy flag that specifies an offloaded copy operation and specifies the storage array's second disk 114 as a destination storage. If an offloaded data transfer token includes a copy flag that specifies an offloaded copy operation and specifies a destination storage, a target system copies source data stored in a source storage to a destination storage. For example, the storage array component 120 copies the confidential data file stored in the storage array's first disk 112 to the storage array's second disk 114. Regardless of whether an offloaded data transfer token includes a copy flag that specifies an offloaded copy operation and specifies a destination storage, a target system continues determining what operations the flags in the offloaded data transfer token specify.

After determining whether an offloaded data transfer token specifies an offloaded copy operation and a destination storage, a target system next determines whether the offloaded data transfer token specifies an offloaded delete operation and the type of the offloaded delete operation. For example, the storage array component 120 determines whether the offloaded data transfer token includes a delete flag that specifies an offloaded delete operation. If an offloaded data transfer token includes a delete flag that specifies an offloaded delete operation, the storage array component 120 determines whether the offloaded data transfer token includes a secure flag that can specify that the offloaded delete operation is an offloaded secure delete operation. If an offloaded data transfer token specifies an offloaded delete operation, a target system deletes source data from a source storage. For example, the storage array component 120 deletes the confidential data file stored on the storage array's first disk 112 because the offloaded data transfer token includes a delete flag that specifies an offloaded delete operation. In another example, the storage array component 120 executes a secure delete algorithm to securely delete the confidential data file stored on the storage array's first disk 112 because the offloaded data transfer token includes a delete flag and a secure flag that specify an offloaded secure delete operation.

If the user of the client 104 selects one of multiple available secure delete operations, the host component 118 specifies this selection in the offloaded data transfer token before sending the offloaded data transfer token to the storage array component 120. Then the storage array component 120 extracts this selection from the offloaded data transfer token, and executes the user-selected secure delete operation. Storage vendors may implement the multiple available secure delete operations at an array firmware/software level. Regardless of whether the delete operation was a secure delete operation, and regardless of whether the delete operation was preceded by a corresponding copy operation, no load is created for the host's central processing unit(s) to execute the delete operation, and no time is spent by the host receiving a transfer confirmation or sending the subsequent delete request.

FIG. 2 illustrates a table 200 of example scenarios for offloaded operations, under an embodiment. Some of the example scenarios depicted in the table 200 may not occur as a practical matter, but are included to comprehensively describe each possible flag combination. If a user of a host makes selections that result in setting no flags in an offloaded data transfer token, no resulting operation occurs. If a user of a host makes selections that result in setting only the copy flag in an offloaded data transfer token, the target system executes a copy operation. If a user of a host makes selections that result in setting only the delete flag in an offloaded data transfer token, the target system executes a delete operation. If a user of a host makes selections that result in setting both the delete flag and the copy flag in an offloaded data transfer token, the target system executes a move operation, which is a copy operation followed by a delete operation. If a user of a host makes selections that result in setting only the secure flag in an offloaded data transfer token, no resulting operation occurs. If a user of a host makes selections that result in setting both the secure flag and the copy flag in an offloaded data transfer token, the target system executes a copy operation. If a user of a host makes selections that result in setting both the secure flag and the delete flag in an offloaded data transfer token, the target system executes a secure delete operation. If a user of a host makes selections that result in setting the secure flag, the delete flag, and the copy flag in an offloaded data transfer token, the target system executes a secure move operation, which is a copy operation followed by a secure delete operation.

Figure 3:
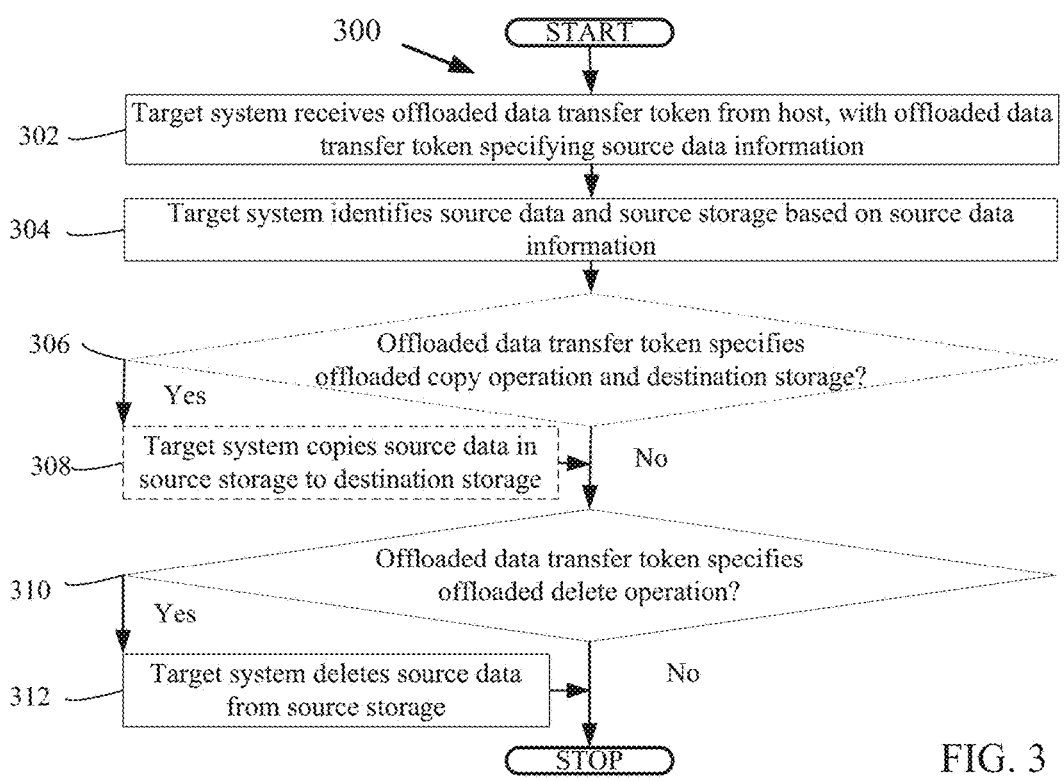
FIG. 3 is a flowchart that illustrates a method for offloaded delete operations, under an embodiment.

FIG. 3 is a flowchart that illustrates a method for offloaded delete operations, under an embodiment. Flowchart 300 illustrates method acts illustrated as flowchart blocks for certain steps involved in and/or between the clients 102-106 and/or the server 108 of FIG. 1.

A target system receives an offloaded data transfer token from a host, with the offloaded data transfer token specifying source data information, block 302. For example, the storage array component 120 receives an offloaded data transfer token from the host component 118 of the desktop computer 104, with the offloaded data transfer token specifying a confidential data file and the storage array's first disk 112.

Having received an offloaded data transfer token, a target system identifies source data and a source storage based on source data information, block 304. For example, the storage array component 120 identifies the location of the confidential data file stored on the storage array's first disk 112.

After receiving an offloaded data transfer token, a target system optionally determines whether the offloaded data transfer token specifies an offloaded copy operation and a destination storage, block 306. For example, the storage array component 120 determines whether the offloaded data transfer token includes a copy flag that specifies an offloaded copy operation and specifies the storage array's second disk 114 as a destination storage. If an offloaded data transfer token specifies an offloaded copy operation and a destination storage, the flowchart 300 continues to block 308 to copy source data stored on a source storage to the destination storage. If an offloaded data transfer token does not specify an offloaded copy operation and a destination storage, the flowchart 300 proceeds to block 310 to determine whether the offloaded data transfer token specifies an offloaded delete operation.

If an offloaded data transfer token specifies an offloaded copy operation and a destination storage, a target system optionally copies source data stored on a source storage to a destination storage, block 308. For example, the storage array component 120 copies the confidential data file stored on the storage array's first disk 112 to the storage array's second disk 114.

After receiving an offloaded data transfer token, a target system determines whether the offloaded data transfer token specifies an offloaded delete operation, block 310. For example, the storage array component 120 determines whether the offloaded data transfer token includes a delete flag that specifies an offloaded delete operation. If an offloaded data transfer token specifies an offloaded delete operation, the flowchart 300 continues to block 312 to delete source data from a source storage. If an offloaded data transfer token does not specify an offloaded delete operation, the flowchart 300 terminates.

If an offloaded data transfer token specifies an offloaded secure delete operation, a target system deletes source data from a source storage, block 312. For example, the storage array component 120 deletes the confidential data file stored on the storage array's first disk 112. In another example, the storage array component 120 executes a secure delete algorithm to securely delete the confidential data file stored on the storage array's first disk 112.

Although FIG. 3 depicts the blocks 302-312 occurring in a specific order, the blocks 302-312 may occur in another order. In other implementations, each of the blocks 302-312 may also be executed in combination with other blocks and/or some blocks may be divided into a different set of blocks.

Figure 4:
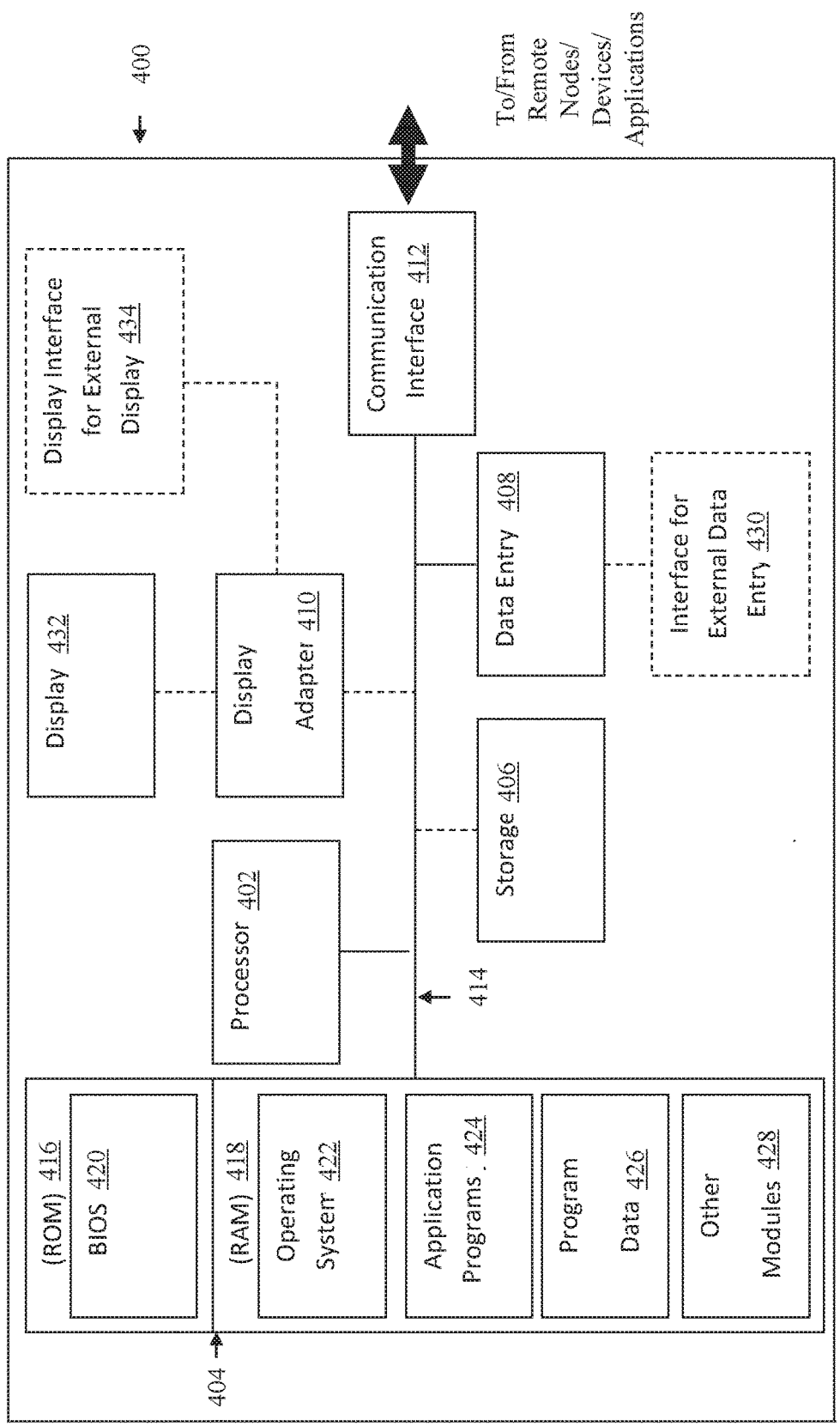
FIG. 4 is a block diagram illustrating an example hardware device in which the subject matter may be implemented.

Having describing the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, a data entry module 408, a display adapter 410, a communication interface 412, and a bus 414 that couples the elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in the memory 404 and/or the storage 406 and/or received via the data entry module 408.

The memory 404 may include read only memory (ROM) 416 and random access memory (RAM) 418. The memory 404 may be configured to store program instructions and data during operation of the hardware device 400. In various embodiments, the memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. The memory 404 may also include nonvolatile memory technologies such as nonvolatile flash RAM (NVRAM) or ROM. In some embodiments, it is contemplated that the memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in the ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, the ROM 416 or the RAM 418, including an operating system 422, one or more applications programs 424, program data 426, and other program modules 428. A user may enter commands and information into the hardware device 400 through the data entry module 408. The data entry module 408 may include mechanisms such as a keyboard, a touch screen, a pointing device, etc. Other external input devices (not shown) are connected to the hardware device 400 via an external data entry interface 430. By way of example and not limitation, external input devices may include a microphone, joystick, game pad, satellite dish, scanner, or the like. In some embodiments, external input devices may include video or audio input devices such as a video camera, a still camera, etc. The data entry module 408 may be configured to receive input from one or more users of the hardware device 400 and to deliver such input to the processing unit 402 and/or the memory 404 via the bus 414.

A display 432 is also connected to the bus 414 via the display adapter 410. The display 432 may be configured to display output of the hardware device 400 to one or more users. In some embodiments, a given device such as a touch screen, for example, may function as both the data entry module 408 and the display 432. External display devices may also be connected to the bus 414 via an external display interface 434. Other peripheral output devices, not shown, such as speakers and printers, may be connected to the hardware device 400.

The hardware device 400 may operate in a networked environment using logical connections to one or more remote nodes (not shown) via the communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, the communication interface 412 may include logic configured to support direct memory access (DMA) transfers between the memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of the hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of the hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description herein, the subject matter is described with reference to acts and symbolic representations of operations that are performed by one or more devices, unless indicated otherwise. As such, it is understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is described in this context, it is not meant to be limiting as those of skill in the art will appreciate that various of the acts and operations described herein may also be implemented in hardware.

To facilitate an understanding of the subject matter described, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for offloaded delete operations, the system comprising:
  a processor-based application, which when executed on a computer, will cause the processor to:
    receive, by a target system, an offloaded data transfer token from a client device, the offloaded data transfer token including source data information, a copy flag and a delete flag;

identify, by a target system, source data and a source storage based on source data information specified in the received offloaded data transfer token;

determine, by the target system, whether the offloaded data transfer token specifies an offloaded delete operation based on the delete flag included in the offloaded data transfer token; and delete, by the target system, the source data from the source storage, in response to a determination that the offloaded data transfer token specifies the offloaded delete operation.

2. The system of claim 1, wherein the offloaded delete operation comprises an offloaded secure delete operation, and deleting the source data from the source comprises executing the offloaded secure delete operation to securely delete the source data from the source.

3. The system of claim 2, wherein executing the offloaded secure delete operation comprises executing an offloaded secure delete algorithm.

4. The system of claim 2, wherein the offloaded secure delete operation comprises a selected one of a plurality of available offloaded secure delete operations.

5. The system of claim 1, wherein the processor-based application further causes the processor to:

determine, by the target system, whether the offloaded data transfer token specifies an offloaded copy operation based on the copy flag included in the offloaded data transfer token and a destination storage; and copy, by the target system, the source data in the source storage to the destination storage, in response to a determination that the offloaded data transfer token specifies the offloaded copy operation and a destination storage.

6. The system of claim 5, wherein the source storage comprises a first disk device and the destination storage comprises a second disk device.

7. The system of claim 6, wherein the first disk device comprises a storage array, and the second disk device comprises one of the storage array and another storage array.

8. A computer-implemented method for offloaded delete operations, the method comprising:

receiving, by a target system, an offloaded data transfer token from a client device, the offloaded data transfer token including source data information, a copy flag and a delete flag;

identifying, by a target system, source data and a source storage based on source data information specified in the received offloaded data transfer token;

determining, by the target system, whether the offloaded data transfer token specifies an offloaded delete operation based on the delete flag included in the offloaded data transfer token; and deleting, by the target system, the source data from the source storage, in response to a determination that the offloaded data transfer token specifies the offloaded delete operation.

9. The method of claim 8, wherein the offloaded delete operation comprises an offloaded secure delete operation, and deleting the source data from the source comprises executing the offloaded secure delete operation to securely delete the source data from the source.

10. The method of claim 9, wherein executing the offloaded secure delete operation comprises executing an offloaded secure delete algorithm.

11. The method of claim 9, wherein the offloaded secure delete operation comprises a selected one of a plurality of available offloaded secure delete operations.

12. The method of claim 8, wherein the method further comprises:

determining, by the target system; whether the offloaded data transfer token specifies an offloaded copy operation based on the copy flag included in the offloaded data transfer token and a destination storage, and copying, by the target system, the source data in the source storage to the destination storage, in response to a determination that the offloaded data transfer token specifies the offloaded copy operation and a destination storage.

13. The method of claim 12, wherein the source storage comprises a first disk device and the destination storage comprises a second disk device.

14. The method of claim 13, wherein the first disk device comprises a storage array, and the second disk device comprises one of the storage array and another storage array.

15. A computer program product, comprising a non-transitory computer-readable medium having a computer-readable program code embodied therein to be executed by one or more processors, the program code including instructions to:

receive, by a target system, an offloaded data transfer token from a client device, the offloaded data transfer token including source data information, a copy flag and a delete flag;

identify, by a target system, source data and a source storage based on source data information specified in the received offloaded data transfer token;

determine, by the target system, whether the offloaded data transfer token specifies an offloaded delete operation based on the delete flag included in the offloaded data transfer token; and delete, by the target system, the source data from the source storage, in response to a determination that the offloaded data transfer token specifies the offloaded delete operation.

16. The computer program product of claim 15, wherein the offloaded delete operation comprises an offloaded secure delete operation, and deleting the source data from the source comprises executing the offloaded secure delete operation to securely delete the source data from the source.

17. The computer program product of claim 16, wherein executing the offloaded secure delete operation comprises executing an offloaded secure delete algorithm.

18. The computer program product of claim 16, wherein the offloaded secure delete operation comprises a selected one of a plurality of available offloaded secure delete operations.

19. The computer program product of claim 15, wherein the program code includes further instructions to:

determine, by the target system, whether the offloaded data transfer token specifies an offloaded copy operation based on the copy flag included in the offloaded data transfer token and a destination storage; and copy, by the target system, the source data in the source storage to the destination storage, in response to a determination that the offloaded data transfer token specifies the offloaded copy operation and a destination storage.

20. The computer program product of claim 19, wherein the source storage comprises a first disk device, the destination storage comprises a second disk device, the first disk device comprises a storage array, and the second disk device comprises one of the storage array and another storage array.

* * * * *